United States Patent
Van Wakeren et al.

(10) Patent No.: US 11,358,096 B2
(45) Date of Patent: Jun. 14, 2022

(54) METHOD FOR BINDING HAZARDOUS AMMONIA IN BOTH LIQUID AND GASEOUS STATES FROM ORGANIC WASTE STREAMS USING CARBON DIOXIDE AT AMBIENT TEMPERATURE AND UNDER AMBIENT PRESSURE

(71) Applicants: Pieter Anthony Philip Van Wakeren, Raleigh, NC (US); Egidijus Griskonis, Kaunas (LT); Tomas Nakas, Kaunas (LT); Michael John Friedman, Winter Garden, FL (US)

(72) Inventors: Pieter Anthony Philip Van Wakeren, Raleigh, NC (US); Egidijus Griskonis, Kaunas (LT); Tomas Nakas, Kaunas (LT); Michael John Friedman, Winter Garden, FL (US)

(*) Notice: Subject to any disclaimer, the term of this patent is extended or adjusted under 35 U.S.C. 154(b) by 349 days.

(21) Appl. No.: 16/667,873

(22) Filed: Oct. 29, 2019

(65) Prior Publication Data
US 2020/0061534 A1    Feb. 27, 2020

Related U.S. Application Data

(63) Continuation-in-part of application No. 16/131,334, filed on Sep. 14, 2018, now abandoned.

(60) Provisional application No. 62/598,770, filed on Dec. 14, 2017.

(51) Int. Cl.
*B01D 53/58* (2006.01)
*B01D 53/79* (2006.01)

(52) U.S. Cl.
CPC .......... *B01D 53/58* (2013.01); *B01D 53/79* (2013.01); *B01D 2257/406* (2013.01)

(58) Field of Classification Search
CPC .. C02F 1/20; C02F 1/441; C02F 1/444; C02F 3/28; C02F 11/04; C02F 2101/15; C01B 32/20; C01B 32/24; C05D 7/00; C05C 1/00; C05C 3/00; C05C 3/005; C01D 17/18; B01D 52/78; B01D 52/79; B01D 52/58;
(Continued)

(56) References Cited

U.S. PATENT DOCUMENTS

| 8,863,435 | B2 | 10/2014 | Grajcar |
| 9,555,361 | B2 | 1/2017 | Hammond |
| 2009/0120288 | A1 | 5/2009 | Lackner et al. |

(Continued)

FOREIGN PATENT DOCUMENTS

WO    2017165849    9/2017

OTHER PUBLICATIONS

Kim et al, "CO2 Capturing Mechanism in Aqueous Ammonia: NH3-Driven Decomposition—Recombination Pathway," https://pubs.acs.org/doi/abs/10.1021/jz200095j.

*Primary Examiner* — Richard M Rump (57) ABSTRACT

A method for binding hazardous ammonia in both liquid or gaseous states from organic waste streams using carbon dioxide at ambient temperature and under ambient pressure to reduce ammonia emissions from farming or industrial operations. The method entraps a quantity of ammonia in an ammonia solution by reacting the quantity of ammonia with a quantity of carbon dioxide within a primary reaction vessel to form an ammonia-bound solution at ambient temperature and under ambient pressure. The ammonia-bound solution is able to be stored or transported for use in future chemical processes.

19 Claims, 5 Drawing Sheets

(58) Field of Classification Search
CPC ...... B01D 2257/406; B01D 2258/0266; C01C 1/26
See application file for complete search history.

(56) References Cited

U.S. PATENT DOCUMENTS

2017/0128880 A1\* 5/2017 Andrews ................ C01C 1/242
2017/0267538 A1  9/2017 Novek \* cited by examiner

METHOD FOR BINDING HAZARDOUS AMMONIA IN BOTH LIQUID AND GASEOUS STATES FROM ORGANIC WASTE STREAMS USING CARBON DIOXIDE AT AMBIENT TEMPERATURE AND UNDER AMBIENT PRESSURE

The current application is a continuation-in-part of U.S. application Ser. No. 16/131,334, filed Sep. 14, 2018, which claims a priority to the U.S. Provisional Patent application Ser. No. 62/598,770 filed on Dec. 14, 2017.

FIELD OF THE INVENTION

The present invention relates generally to the reduction of hazardous gas emissions. More specifically, the present invention relates to a method of binding hazardous ammonia in both liquid and gaseous states using carbon dioxide to reduce ammonia emission from organic waste streams and industrial wastes processes, manure processing and anaerobic digesters.

BACKGROUND OF THE INVENTION

Currently, a significant amount of agricultural and industrial operations worldwide use gas scrubbers to capture gaseous ammonia ($NH_3$) and bind it in the form of ammonium ions ($NH_4^+$) using sulfuric acid $H_2SO_4$. This process is a non-organic chemical reaction that results in ammonium sulfate, a non-organic compound. Highly concentrated sulfuric acid used in this process is a serious chemical hazard in agricultural, industrial environments and beyond, and is not suitable for future sustainable agricultural technologies and practices. Further, biological gas scrubbers, primarily found on farms in Northern Europe (EU), process the biological gas through a gas scrubber utilizing trickling filtration, whereby nitrifying bacteria are grown to oxidize ammonia or ammonium ions into nitrate ions ($NO_3^-$). Attempts to capture/bind ammonia or ammonium ions ($NH_3/NH_4^+$) successfully at commercial scale have been done in the EU, primarily in geographies such as the Netherlands, Belgium, Germany and Denmark, using sulfuric acid to produce ammonium sulfate salt when reacted with the ammonia or ammonium ions. In the Netherlands, the capture of gaseous ammonia is required by law to reduce environmental impact of farming operations and other ammonia emitting industries. In agricultural processes, gaseous ammonia is mostly emitted to the atmosphere. Ammonia and ammonium ions are valuable compounds, especially when captured, stored and made available for further processing in various industries.

The present invention is a method for binding hazardous ammonia from organic waste streams, primarily derived from agricultural origin and from industrial waste processing, using carbon dioxide. A primary objective of the present invention is to capture hazardous ammonia in both liquid and gaseous states using carbon dioxide as a capturing, binding medium (carrier) and particularly relates to the treatment of liquids solutions or gases mixtures containing dissolved ammonia and ammonium ions to bind the ammonia or ammonium ions to produce ammonium bicarbonate ($NH_4HCO_3$), ammonium carbonate (($NH_4)_2CO_3$) and ammonium carbamate ($H_2NCOONH_4$), or combinations thereof. Excess ammonia is often created during the production of livestock, in several forms, including, but not limited to manures and aviary wastes. Ammonia is often released when these, as well as other organic waste streams are processed. Examples of processing of organic waste include, but are not limited to composting, drying, aerobic digestive processes, and anaerobic digestion processes. In addition, ammonia is also a by-product for many industries, including but not limited to petroleum refining and industrial chemical processes. Although the present invention focuses on capturing/binding ammonia or ammonium ions and forming ammonium carbonate, ammonium bicarbonate, and/or ammonium carbamate from organic waste streams such as livestock and manure processing operations, the present invention can also be easily applied to alternative industrial settings that produce an excess of ammonia or ammonium ions.

DETAIL DESCRIPTIONS OF THE INVENTION

All illustrations of the drawings are for the purpose of describing selected versions of the present invention and are not intended to limit the scope of the present invention.

The present invention is a method for binding hazardous ammonia in both liquid and gaseous states derived from organic waste streams, primarily of agricultural origin using carbon dioxide. The formation of ammonia gas originates from farming operations producing livestock, such as cows, pigs, and poultry as well as the organic waste processing operations commonly including anaerobic digesters for the production of methane as well as the organic waste processing operations such as composting and manure drying. The present invention removes ammonia from the exhaust gases or liquid residues from farming and waste processing operations, and allows for the storage and transport of ammonia for future applications. Implementation of the present invention allows a user to reduce emissions originating from said activities, including cows, pig, and poultry livestock production, and other waste processing operations such as anaerobic digestion, composting, manure drying, and manure processing. The present invention seeks to eliminate or reduce the environmental impact from these emissions.

Figure 1:
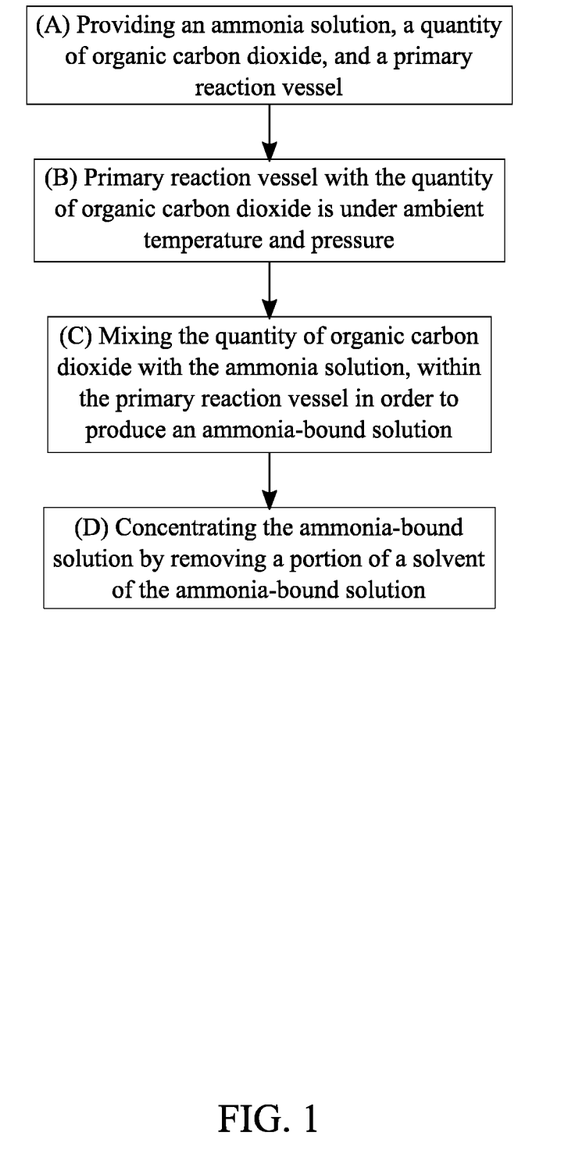
FIG. 1 is a flow diagram for the steps of the present invention.

In order to execute the present invention, an ammonia solution, a quantity of carbon dioxide, and a primary reaction vessel are required (Step A), shown in FIG. 1. The ammonia can be a source of ammonia, either gaseous or liquid, collected from emissions from livestock farming, organic waste processing or the like. The ammonia solution comprises a quantity of aqueous ammonia, a quantity of ammonium ions, and a quantity of water. The quantity of carbon dioxide is the binding agent that reacts with the ammonia or ammonium ions within the ammonia solution to form an ammonia salt solution. Initially, the primary reaction vessel containing a solvent is brought in contact with ammonia gas in ambient temperature and under ambient pressure, the ammonia gas dissolves in the solvent due to its high solubility property. There is no requirement that the primary reaction vessel be constructed of stainless steel or similar material as the present invention does not require the use of elevated pressure or temperature. A quantity of carbon dioxide is introduced to the ammonia and solvent using microbubble injectors in order to provide a concentration of carbon dioxide that is equal to or larger than the ammonia or ammonia ions within the primary vessel. These carbon dioxide injectors insert bubbles of carbon dioxide gas with a size between 5 and 200 microns into the ammonia solution. These carbon dioxide bubbles behave as particles in a liquid without separating from the liquid. In other words, the carbon dioxide remains in the liquid without using pressure. The process takes place at ambient temperature and under ambient pressure (Step B), in accordance with FIG. 1. As microbubbles behave like a liquid, and do not separate from a liquid like a gas, this process can be executed under ambient pressure and at ambient temperature. There is no need or requirement to use a $CO_2$ equilibrium, or to use pressure to insert $CO_2$ into the liquid. The quantity of carbon dioxide is mixed with the ammonia solution within the primary reaction vessel in order to produce an ammonia-bound solution (Step C). The ammonia-bound solution is a liquid solution that allows the transportation of the ammonia to be efficient locally or from site to site. The ammonia bound-solution comprises a solute and ammonia salts selected from the group consisting of ammonium bicarbonate ($NH_4HCO_3$), ammonium carbonate (($NH_4)_2CO_3$), ammonium carbamate ($H_2NCOONH_4$), or combinations thereof. The ammonia-bound solution is then concentrated by removing a portion of the solvent of the ammonia-bound solution (Step D). Generally, the solvent is preferred to be water, due to the favorable solubility properties of ammonia and ammonium salts with water. The ammonia-bound solution can be concentrated by adding carbon dioxide and ammonia continuously. This concentration process is capable of increasing the bound ammonia to the point of crystallization. The crystallized ammonium salt will precipitate by gravity. In other words, the concentration process takes place simply by continuous insertion of ammonia and $CO_2$ into the solution which creates a natural separation by precipitation. Concentration of ammonia takes place without the use of reverse osmosis or evaporation of liquid.

In some embodiments of the present invention, the aqueous ammonia and the ammonium ions of the ammonia solution are obtained from a quantity of agricultural waste using a quantity of compressed air. Detailed in FIG. 2, the quantity of agricultural waste comprises a quantity of agricultural ammonia. Prior to Step A, the quantity of agricultural waste is aerated with the quantity of compressed air to extract the quantity of agricultural ammonia from the quantity of agricultural waste. This extraction process utilizes the convection of the quantity of compressed air from the aeration to transition the quantity of agricultural ammonia into the gaseous phase. The quantity of gaseous ammonia is then dissolved into a quantity of solvent to produce the ammonia solution.

Figure 2:
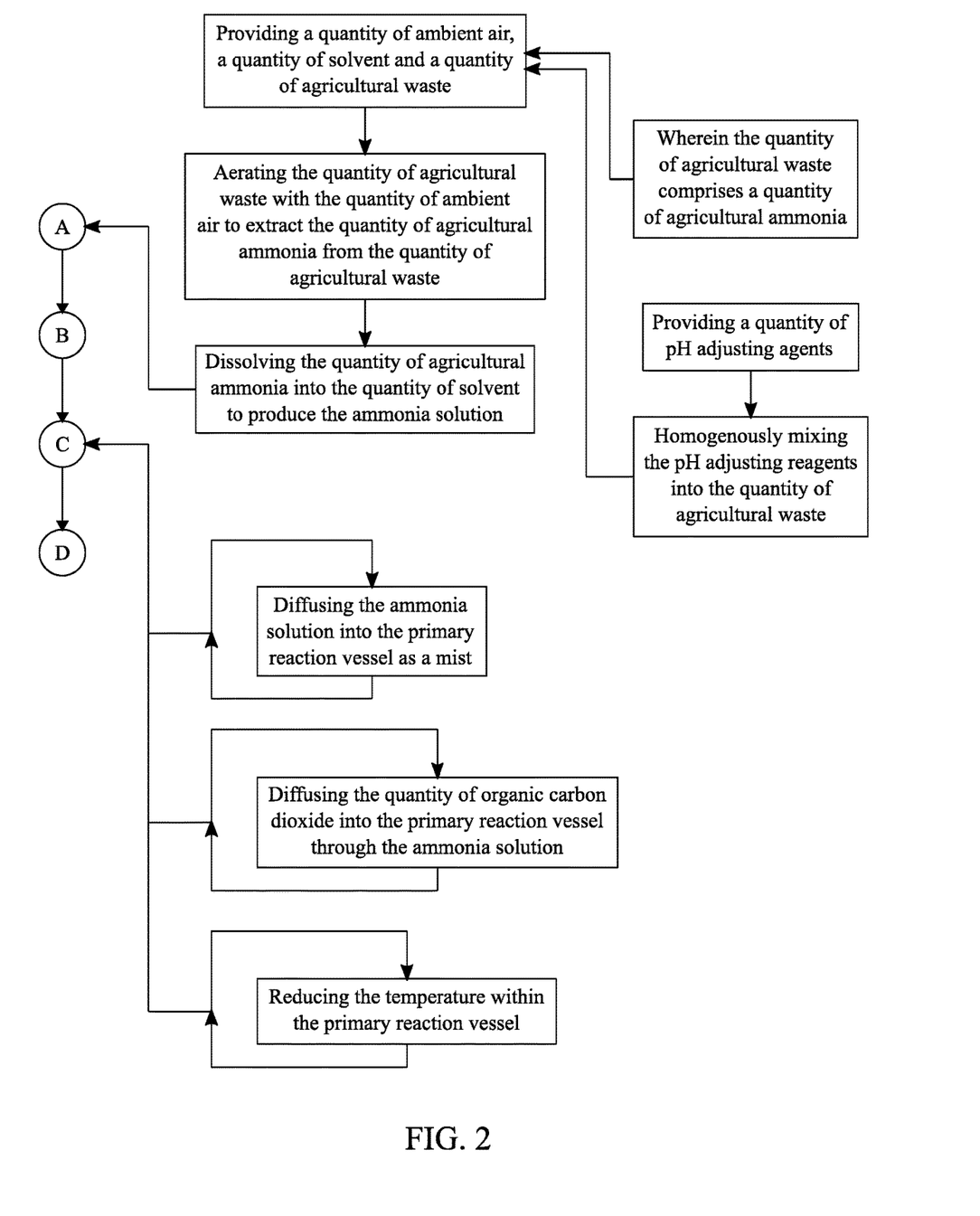
FIG. 2 is a more specific flow diagram for the steps of the present invention.

In some embodiments of the present invention, where high climatic ambient temperatures exceed 35° C., the temperature within the primary reaction vessel is reduced using a heat exchanger, during Step C, shown in FIG. 2. By reducing the temperature, the ammonia-bound solution has a decreased tendency to transition into the gas phase. Therefore, the ammonia-bound solution remains stable and easily stored or transported for future processing and applications.

In some embodiments of the present invention the ammonia solution is diffused into the primary reaction vessel as a mist, during Step C, shown in FIG. 2. By diffusing the ammonia solution as a mist, the interface surface area that the quantity of organic carbon dioxide is able to be in contact with the ammonia solution is increased. Therefore, the reaction rate to produce the ammonium-bound solution is increased. In an alternate embodiment of the present invention, the quantity of organic carbon dioxide is diffused into the primary reaction vessel through the ammonia solution to similarly increase the interface surface area between the ammonia solution and the quantity of organic carbon dioxide, during Step C, detailed in FIG. 2.

After the ammonia-bound solution is concentrated during Step D, the ammonia-bound solution is able to be stored or utilized in future chemical processes. For future chemical processes that require ammonia, the ammonia-bound solution is heated to separate the ammonia-bound solution into a quantity of ammonia product, a quantity of carbon dioxide product, and a quantity of water product, in accordance to FIG. 2.

Figure 3:
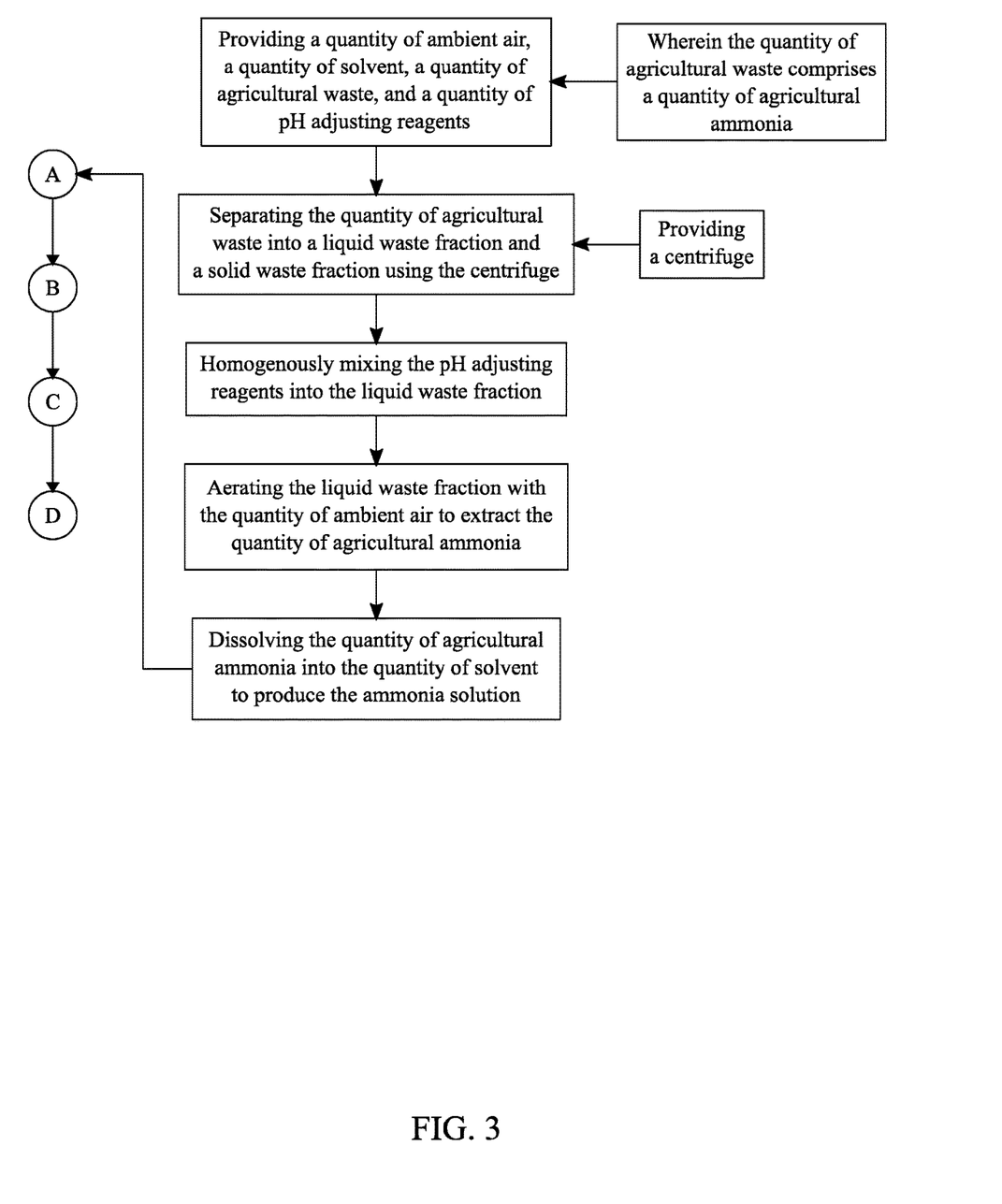
FIG. 3 is a flow diagram for the steps of the present invention, wherein the present invention utilizes a centrifuge to separate the quantity of agricultural waste into a liquid waste fraction and a solid waste fraction in a prior step of Step A.
Figure 4:
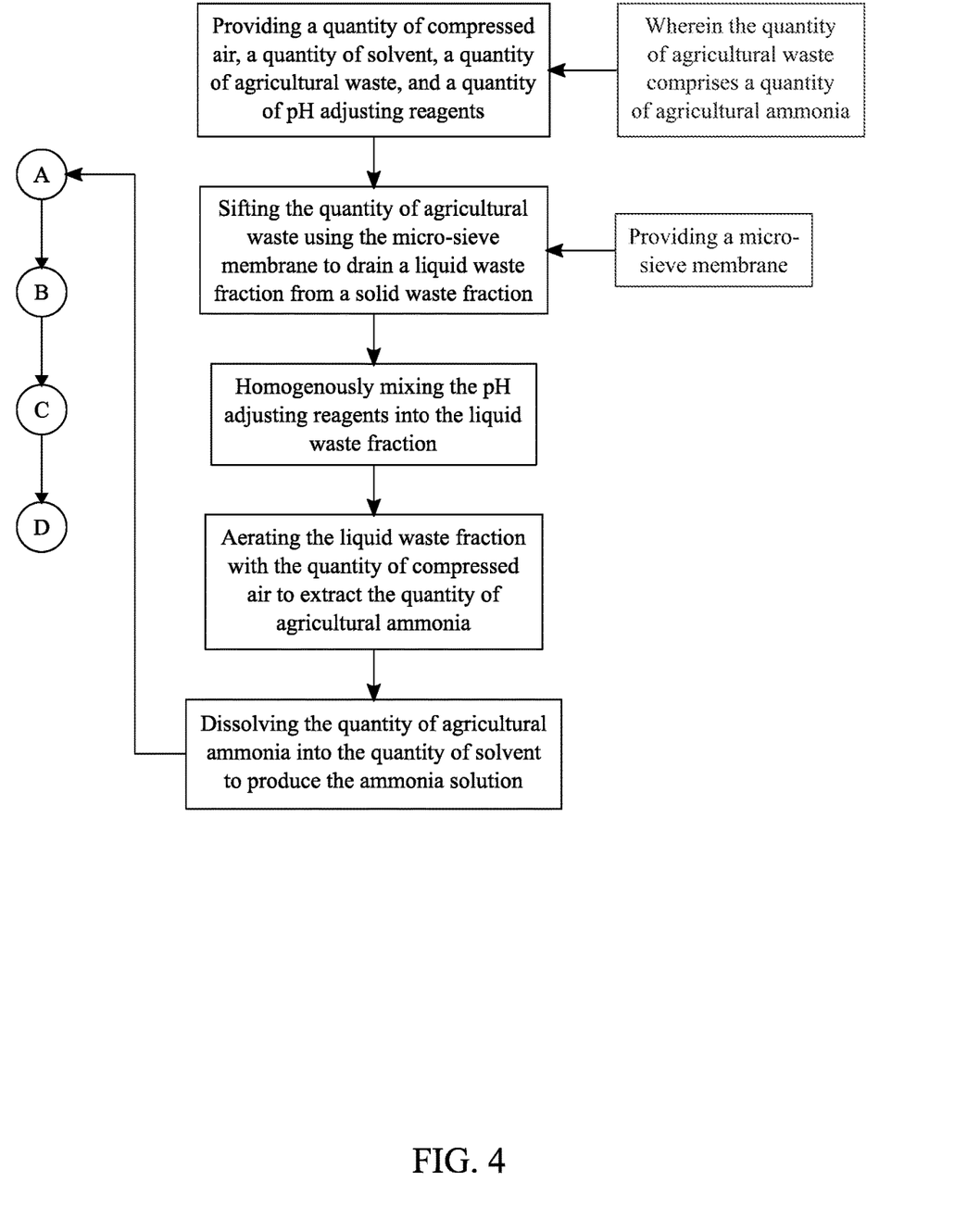
FIG. 4 is a flow diagram for the steps of the present invention, wherein the present invention utilizes a microsieve membrane to separate the quantity of agricultural waste into a liquid waste fraction and a solid waste fraction in a prior step of Step A.

For a more specific embodiment of the present invention, the present invention utilizes a centrifuge to separate the quantity of agricultural waste, such that the extraction of the quantity of agricultural ammonia is more efficient, shown in FIG. 3. The quantity of agricultural waste is separated into a liquid waste fraction and a solid waste fraction. The quantity of agricultural ammonia is present in both the liquid waste fraction and the solid waste fraction; however; there is a negligible presence within the solid waste fraction. Once the liquid waste fraction is decanted from the solid waste fraction, the liquid waste fraction is then aerated with the quantity of compressed air to extract the quantity of agricultural ammonia. For an alternate embodiment of the present invention, the present invention utilizes a micro-sieve membrane to accomplish the separation of the liquid waste fraction and the solid waste fraction, detailed in FIG. 4. The quantity of agricultural waste is sifted using the micro-sieve membrane to drain the liquid waste fraction from the solid waste fraction. The liquid waste fraction is then similarly aerated with the quantity of compressed air to extract the quantity of agricultural ammonia. In accordance to a specific embodiment of the present invention, the quantity pH adjusting reagent is homogenously mixed with the liquid waste fraction, prior to the aeration of the liquid waste fraction, shown in FIG. 3 and FIG. 4. Thus, the quantity of ammonia within the liquid waste fraction is readily extracted during the aeration of the liquid waste fraction.

Figure 5:
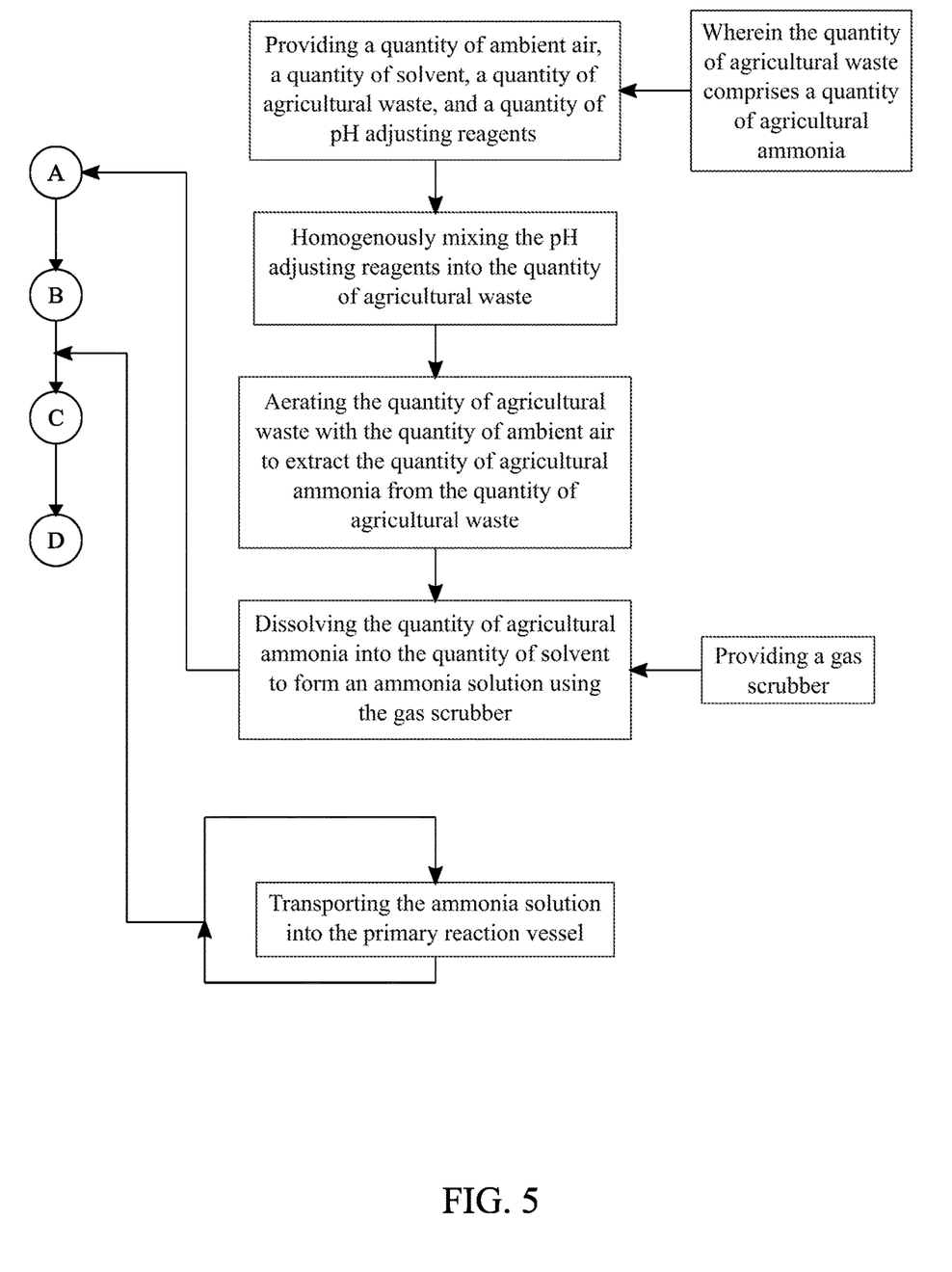
FIG. 5 is a flow diagram for the steps of the present invention, wherein the present invention utilizes a gas scrubber to produce the ammonia solution.

In accordance to the preferred embodiment, a quantity of pH adjusting reagent is utilized to increase the ease which the ammonia evaporates during the aeration of the agricultural waste. Detailed in FIG. 2 and FIG. 5, the quantity of pH adjusting reagent is homogenously mixed with the quantity of the agricultural waste, prior to aeration of the agricultural waste, such that the quantity of pH adjusting reagent favorably adjusts the level of acidity of the quantity of agricultural waste. The adjustment to the pH of the agricultural waste shifts the concentration of the ammonia, such that the quantity of ammonia is more amenable to the aeration process to produce a higher yield of the ammonia solution.

Once the quantity of ammonia is aerated into the gaseous phase or if the quantity of ammonia is already present in the gaseous phase, the quantity of ammonia is dissolved into the quantity of solvent. In accordance to FIG. 5, a gas scrubber and the quantity of solvent are utilized to form the ammonia solution. The quantity of ammonia is dissolved in the quantity of solvent to form the ammonia solution using the gas scrubber. The gas scrubber forces the quantity of ammonia into the solvent to allow the quantity of ammonia to be removed from the gaseous emissions. The ammonia solution is then transported to the primary reaction vessel, using a liquid pump.

For an exemplary implementation of the present invention, a farm produces pigs and primarily utilizes a gas scrubber to capture the quantity of ammonia emissions. By adjusting the pH, a quantity of air is used to force evaporation of the quantity of ammonia from the liquid waste fraction of the organic wastes. In this example, pig manure was previously separated into a liquid waste fraction and a solid waste fraction with a centrifuge. The quantity of ammonia-rich gas from the liquid waste fraction is then processed by running the ammonia rich gas through the liquid of the primary reaction vessel, which contains a solvent infused with carbon dioxide gas. The ammonia dissolves in the solvent and binds to the carbon dioxide forming ammonium carbonate salt.

In another exemplary implementation of the present invention, a farming operation produces poultry eggs and utilizes the present invention to obtain the ammonia-bound solution from chicken litter composting operations. The present invention can introduce and increase or optimize the farm's revenue, as well as reduce its environmental impact. The evaporation for the quantity of ammonia can be stimulated by introducing composting systems to compost chicken litter. Composting of chicken litter evaporates and ferments chicken litter that results in useful organic chicken compost fertilizer and a gaseous quantity of ammonia. The evaporated quantity of agricultural ammonia can be controlled within an enclosed environment and captured by using gas scrubbers. The gaseous quantity of ammonia is dissolved in the quantity of solvent, water, due to its high solubility. The ammonia solution is transported into the primary reaction vessel where carbon dioxide is injected into the ammonia solution. The ammonia and carbon dioxide form ammonium bicarbonate, ammonium carbonate, and ammonium carbamate.

Still in another exemplary implementation of the present invention, a farming operation produces pigs, and subsequently large amounts of pig manure with the potential to add revenue by producing the ammonia-bound solution and reduce odor emissions simultaneously. The farming operation introduces separation of the pig manure in a liquid waste fraction and a solid waste fraction using a centrifuge. An amount of pH reagent is used to adjust the pH and form ammonia gas. The quantity of ambient air aerates a liquid waste fraction and evaporates the quantity of ammonia. The quantity of ammonia is transported through the quantity of solvent to form the ammonia solution. The ammonia solution is circulated into the primary reaction vessel to form ammonia-bound solution with the quantity of carbon dioxide, wherein the ammonia-bound solution is a combination of ammonium bicarbonate, ammonium carbonate, and ammonium carbamate.

In another exemplary implementation of the present invention, digestate from an anaerobic digester for the production of methane is processed by separating the digestate into solid and liquid waste fractions using a centrifuge. A pH regulating alkaline compound is inserted to transfer the ammonia solution into gaseous ammonia. Ambient air is than used to aerate the digestate in order to separate the ammonia gas from the digestate. The gas, now containing the ammonia gas and ambient air, is then inserted into a solvent where carbon dioxide is inserted using microbubble injectors. The ammonia comes in contact with the solvent, and dissolves in the solvent, which contains an amount of available carbon dioxide, which forms ammonium bicarbonate, ammonium carbonate, and ammonium carbamate. These salts are then concentrated by separating parts of the solvent and available for future processing.

In another exemplary implementation of the present invention, an industrial chicken litter drying operation uses a hot air dryer which results in drying the chicken litter by separation of water and ammonia. The air emitted from the industrial drying process contains a high amount of ammonia which is then brought in contact with water by using a gas scrubber. The gas scrubber dissolves the ammonia in the water. The water is then injected with carbon dioxide using microbubble injectors. The carbon dioxide and the ammonia in the water form ammonium bicarbonate, ammonium carbonate, and ammonium carbamate. The water is then separated from the ammonia salts by precipitation in order to concentrate for storage, transport and further processing.

Although the invention has been explained in relation to its preferred embodiments, it is to be understood that many other possible modifications and variations can be made without departing from the spirit and scope of the invention as hereinafter claimed.

What is claimed is:

1. A method for binding hazardous gaseous ammonia from organic waste streams, using carbon dioxide and the method comprising the following steps:
   (A) providing a quantity of ammonia from an organic source in gaseous form, a quantity of carbon dioxide, and a primary reaction vessel, wherein the gaseous ammonia is dissolved in water to form an ammonia solution;
   (B) injecting the quantity of carbon dioxide, via micro-sized bubbles having a size of between 5 and 200 microns, into the primary reaction vessel at ambient temperature and under ambient pressure;
   (C) mixing the micro-sized carbon dioxide bubbles with the ammonia solution, in the primary reaction vessel at ambient temperature and under ambient pressure in order to produce an ammonia-bound solution, which comprises ammonia salts selected from the group consisting of ammonium bicarbonate, ammonium carbonate, ammonium carbamate and a combination thereof; and
   (D) concentrating the ammonia-bound solution by removing a portion of the solvent of the ammonia-bound solution by means of crystallization and precipitation within the same reaction vessel, without the use of reverse osmosis or evaporation of water.

2. The method for binding hazardous ammonia from organic waste streams using carbon dioxide according to claim 1, wherein the ammonia solution in step (A) comprises aqueous ammonia, ammonium ions, and water at ambient temperature, without heating or cooling the solution to preserve its stability.

3. The method for binding hazardous ammonia from organic waste streams using carbon dioxide according to claim 1, wherein the ammonia solution in step (A) is diffused into the primary vessel as a mist.

4. The method for binding hazardous gaseous ammonia from organic waste streams using carbon dioxide according to claim 1, wherein a gas scrubber is added during the preparation of the ammonia solution in step (A) to increase the quantity of ammonia gas in water, and wherein the gas scrubber is not sulfuric acid.

5. The method for binding hazardous gaseous ammonia from organic waste streams using carbon dioxide according to claim 1, wherein a quantity of pH adjusting agent is added to the organic waste streams to transition aqueous ammonia to ammonia gas in the organic waste streams in a prior step of step (A).

6. The method for binding hazardous gaseous ammonia from organic waste streams using carbon dioxide according to claim 1, wherein a centrifuge or a micro-sieve membrane is used for separating liquid waste fraction from solid waste fraction of the organic waste streams in a prior step of step (A).

7. The method for binding hazardous gaseous ammonia from organic waste streams using carbon dioxide according to claim 1, wherein a quantity of organic waste streams is aerated with a quantity of ambient air to extract ammonia gas in a prior step of step (A).

8. The method for binding hazardous gaseous ammonia from organic waste streams using carbon dioxide according to claim 1, wherein the carbon dioxide micro-sized bubbles in step (C) behave as particles in a liquid without separating from the liquid under ambient pressure and at ambient temperature.

9. The method for binding hazardous gaseous ammonia from organic waste streams using carbon dioxide according to claim 1, wherein the primary reaction vessel that works at ambient temperature and under ambient pressure in step (C) reduces expense of system, increases efficiency of process, and reduces energy cost.

10. The method for binding hazardous ammonia from organic waste streams using carbon dioxide according to claim 1, wherein the concentrating of the ammonia-bound solution in step (D) occurs under ambient pressure and at ambient temperature.

11. The method for binding hazardous ammonia from organic waste streams using carbon dioxide according to claim 1, wherein the ammonia-bound solution obtained from step (D) is used for storage, transport or further processing.

12. A method for binding hazardous liquid ammonia from organic waste streams, using carbon dioxide and the method comprising the following steps:
   (A) providing a quantity of ammonia from an organic source in liquid form, a quantity of carbon dioxide, and a primary reaction vessel, wherein the ammonia in liquid phase is converted to a gaseous phase by adjusting the pH, and the gaseous ammonia is dissolved in water to form an ammonia solution;
   (B) injecting the quantity of carbon dioxide, via micro-sized bubbles having a size of between 5 and 200 microns, into the primary reaction vessel at ambient temperature and under ambient pressure;
   (C) mixing the micro-sized carbon dioxide bubbles with the ammonia solution, within the primary reaction vessel at ambient temperature and under ambient pressure in order to produce an ammonia-bound solution, which comprises ammonia salts selected from the group consisting of ammonium bicarbonate, ammonium carbonate, ammonium carbamate and a combination thereof; and
   (D) concentrating the ammonia-bound solution by removing a portion of the solvent of the ammonia-bound solution by means of crystallization and precipitation within the same reaction vessel, without the use of reverse osmosis or evaporation of the solute, water.

13. The method for binding hazardous ammonia from organic waste streams using carbon dioxide according to claim 12, wherein the ammonia solution in step (A) comprises aqueous ammonia, ammonium ions, and water at ambient temperature, without heating or cooling the solution to preserve its stability.

14. The method for binding hazardous ammonia from organic waste streams using carbon dioxide according to claim 12, wherein the ammonia solution in step (A) is diffused into the primary vessel as a mist.

15. The method for binding hazardous gaseous ammonia from organic waste streams using carbon dioxide according to claim 12, wherein a gas scrubber is added during the preparation of the ammonia solution in step (A) to increase the quantity of ammonia gas in water, and wherein the gas scrubber is not sulfuric acid.

16. The method for binding hazardous gaseous ammonia from organic waste streams using carbon dioxide according to claim 12, wherein the carbon dioxide micro-sized bubbles in step (C) behave as particles in a liquid without separating from the liquid under ambient pressure and at ambient temperature.

17. The method for binding hazardous gaseous ammonia from organic waste streams using carbon dioxide according to claim 12, wherein the primary reaction vessel that works at ambient temperature and under ambient pressure in step (C) reduces expense of system, increases efficiency of process, and reduces energy cost.

18. The method for binding hazardous ammonia from organic waste streams using carbon dioxide according to claim 12, wherein the concentrating of the ammonia-bound solution in step (D) occurs under ambient pressure and at ambient temperature.

19. The method for binding hazardous ammonia from organic waste streams using carbon dioxide according to claim 12, wherein the ammonia-bound solution obtained from step (D) is used for storage, transport or further processing.

* * * * *